(12) United States Patent
Che

(10) Patent No.: US 8,173,012 B1
(45) Date of Patent: May 8, 2012

(54) MARINE OIL LEAK RECOVERY AND MARINE PETROLEUM MINING METHOD

(76) Inventor: Hue Nguyen Che, Long Beach, CA (US)

( * ) Notice: Subject to any disclaimer, the term of this patent is extended or adjusted under 35 U.S.C. 154(b) by 0 days.

(21) Appl. No.: 12/928,236

(22) Filed: Dec. 7, 2010

Related U.S. Application Data

(60) Provisional application No. 61/403,532, filed on Sep. 17, 2010.

(51) Int. Cl.
*C02F 1/40* (2006.01)
*E21B 43/01* (2006.01)

(52) U.S. Cl. ........... 210/170.05; 210/170.11; 210/242.3; 210/923; 405/60; 166/357; 166/367

(58) Field of Classification Search ............... 210/747.5, 210/747.6, 776, 802, 170.05, 170.09, 170.11, 210/242.3, 521, 922, 923; 405/60; 254/334; 166/357, 367
See application file for complete search history.

(56) References Cited

U.S. PATENT DOCUMENTS

| | | | | |
|---|---|---|---|---|
| 3,500,841 A * | 3/1970 | Logan | 210/923 |
| 3,548,605 A * | 12/1970 | Armistead et al. | 405/60 |
| 3,658,181 A * | 4/1972 | Blair | 210/170.05 |
| 3,674,150 A * | 7/1972 | Lejeune | 210/923 |
| 3,717,001 A * | 2/1973 | Tam | 405/60 |
| 3,724,662 A * | 4/1973 | Ortiz | 210/242.3 |
| 3,784,013 A * | 1/1974 | Daniel | 210/242.3 |
| 4,019,716 A * | 4/1977 | Smith | 254/334 |
| 4,395,157 A * | 7/1983 | Cunningham | 405/60 |
| 4,449,850 A * | 5/1984 | Cessou et al. | 405/60 |
| 4,988,441 A * | 1/1991 | Moir | 210/522 |
| 5,056,957 A * | 10/1991 | Wood, Jr. | 210/923 |
| 5,840,198 A * | 11/1998 | Clarke | 210/521 |

\* cited by examiner

*Primary Examiner* — Christopher Upton

(57) ABSTRACT

A vertical flexible oil flow director hose is used to recover, to guide, and to filter the spilled oil from its source beneath the sea floor to the surface of water and to accumulate the floating oil therein for being ready to be pumped into an oil tanker. The said hose extends in the sea all the way from the sea floor to the surface of water by connecting its lower end to a circular sinking weight block and its upper end to a hollow doughnut-shaped floating device. The said hose includes two main portions abutting each other, the lower portion is for guiding and displacing water out through the gaps or meshes. The upper portion is for continued guiding and accumulating the oil in its upper section. A gas-tight dome cap having an opening at its bottom may be used to cap the upper opening of the oil accumulator well in the floating object, for holding the gas as necessary. A gas-compressor and gas tank or tanks will be equipped on the oil tanker ready to take and to store the gas.

4 Claims, 5 Drawing Sheets

MARINE OIL LEAK RECOVERY AND MARINE PETROLEUM MINING METHOD

CROSS-REFERENCE TO RELATED APPLICATIONS

Provisional patent application No. 61/403,532 which was filed on Sep. 17, 2010.
Non-provisional patent application Ser. No. 12/928,236 which was filed on Dec. 7, 2010.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention relates to a simple and inexpensive method for the containment and recovery of leaking mineral or crude oil from the sea floor. Additionally, it provides an easy way to extract marine petroleum from an oil reserve located beneath the sea floor.

BACKGROUND OF THE INVENTION

The present invention is in the technical field of oil recovery. More particularly, the present invention is in the technical field of portable oil recovery devices. More particularly, the present invention is in the technical field of portable oil recovery in marine environments. The present invention provides a method that may solve the problem of oil spills from the sea floor such as the one presented by the recent Deepwater Horizon Oil Spill in the Gulf of Mexico.

Conventional marine oil recovery devices are typically either immovable or exceedingly difficult to transport. British Petroleum, whose damaged oil well was the source of the Deepwater Spillage, applied a number of different and expensive techniques involving filters and absorbent pads which failed to contain the spillage. By the time British Petroleum managed to finally cap the wellhead, an estimated 4,900,000 barrels of crude oil had spilled into the Gulf of Mexico, resulting in billions of dollars in damages to the environment and local businesses.

The British Petroleum wellhead was under pressure, which was why the capping method applied in that case, had been so difficult to accomplish. The present invention allows for the release of the pressure in the wellhead, while directing the oil and gas mixture to the water surface via a vertical flexible hose. As it performs these functions, it is able to filter the water out from said vertical flexible hose, thus eliminating the need to separate oil from water at the surface. The next necessary steps will be described in detail later in this application.

In U.S. Pat. No. 4,290,714, Booth relates to a device for containing and recovering effluents from submarine oil leaks at the source, in which the oil containment sleeve has several separated sections of the telescoping type, however it provides no mechanism for water to be filtered out from inside of the sleeve involved with that patent.

In contrast, this new invention allows water to be filtered out of the sleeve (Vertical Flexible Hose), thus making the collection and containment of the crude oil from the spill more efficient. By filtering out the water through the sleeve, only crude oil will be brought to the surface. The present invention is based on the following properties: 1) mineral oil is a non-polar organic compound which makes it more viscous than water; 2) mineral oil is less dense than water which means it will float on top of water; and 3) mineral oil is not soluble in water since mineral oil is non-polar and water is polar. These three properties provide the physical mechanics to separate oil from the water through this invention's filtering method.

SUMMARY OF THE INVENTION

A vertical and flexible oil flow director hose is used to recover and guide oil spilling from the sea floor to the water surface. Marine water is filtered out of the oil flow director hose because water is denser than oil, and is subject to hydrogen bonding which will draw the water out from the oil flow director hose. Oil is accumulated at the top of said hose, and can be pumped into an oil tanker or into another storage vessel. Meanwhile, gasses from the wellhead are also directed towards the surface by the same director hose, and held above the oil. The gasses are contained in a fixed dome cap, to be compressed into gas tanks on the surface. The oil flow director hose extends all the way from the sea floor to the water surface. The lower end of the hose is attached to a toroid sinking weight block, and its upper end to a hollow doughnut-shaped floating device; therefore, the overall length of the said hose must be greater than the depth of the water on site. The said hose consists of two main portions: the lower portion is for guiding oil up and filtering water out from inside of the hose, while the upper portion continues guiding the mixture of oil/gas flow up towards the water surface, where the oil will accumulate in the upper section. A gas-tight dome cap is bolted onto the opening of the floating device, enabling it to capture all the gases from the source on the sea floor. A gas compressor and gas tanks should be equipped in the oil tanker to remove and store the gas.

Figure 1:
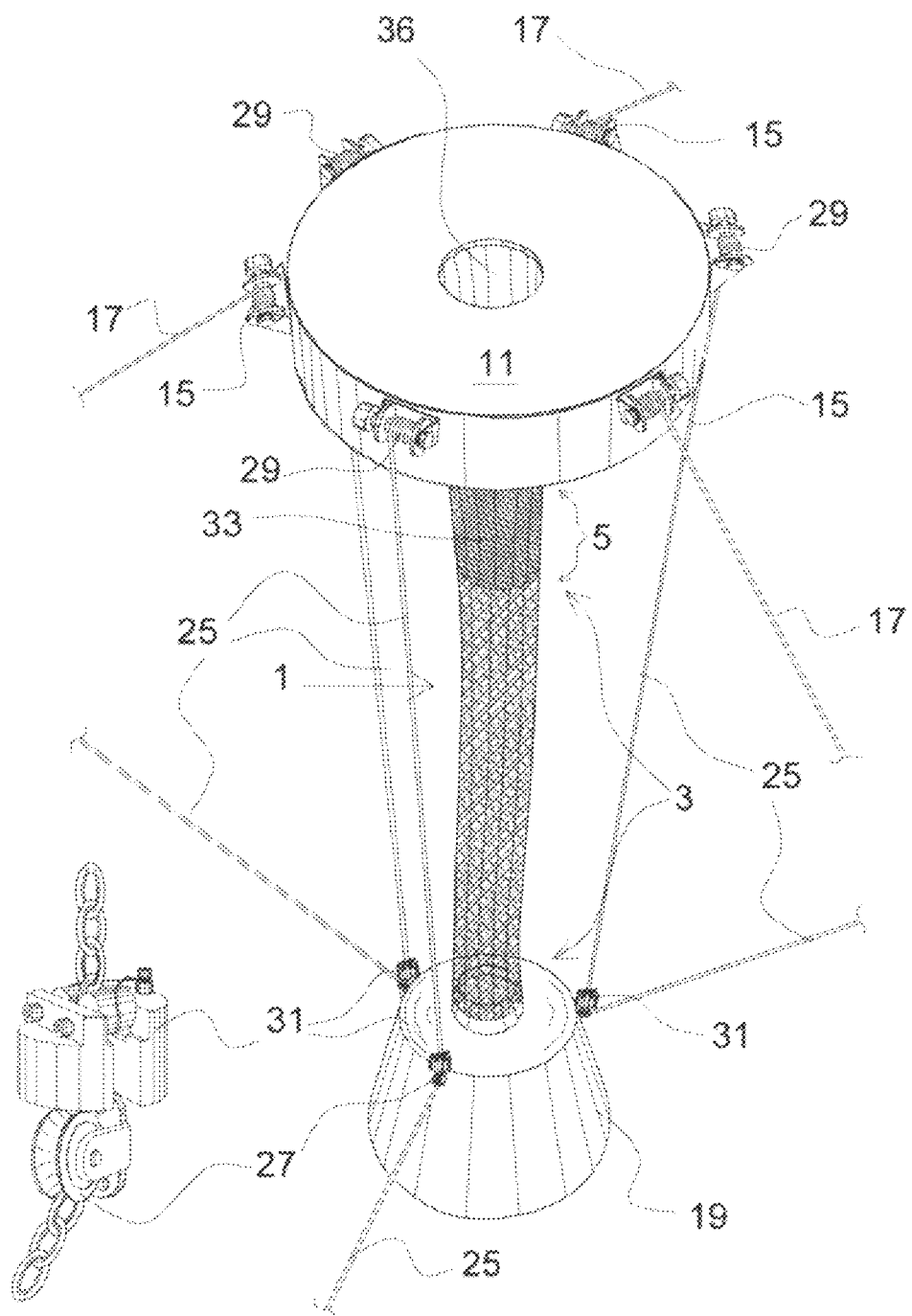
FIG. 1 is a sectional top and side view depiction of the arrangement of the system.

DRAWING REFERENCE NUMERALS 1. vertical flexible oil flow director hose
3. lower portion of hose 1

5. upper portion of hose 1
6. funnel-shaped cones
7. funnel-shaped type sleeve
8. gaps in sleeve 7
9. helical-coil type sleeve with tapered circles
10. gaps in helical-coil type sleeve [9]
11. hollow doughnut-shaped floating device
12. tapered circles in helical-coil [9]
13. anchors for donut-shaped floating device [11]
14. chains holding funnel-shaped cones together
15. winches for connecting donut-shaped floating device [11] to anchors [13]
17. lines for connecting anchors [13] to winches [15]
19. toroid sinking weight block
20. oil source
21. hole opening
23. anchors for toroid sinking weight block [19]
25. lines for connecting anchors [23] to toroid sinking weight block [19], then to doughnut-shaped floating device [11]
27. pulleys on toroid sinking weight block [19]
29. winches for line [25]
31. line lockers
33. oil accumulator
35. oil tanker
36. oil accumulator well in the doughnut-shaped floating device [11]
37. gas accumulator dome cap
41. flange bracket around the opening of dome cap [37]
43. oil pump
45. gas compressor
47. gas tank

DETAILED DESCRIPTION

The present invention provides a method in which mineral and crude oil can be recovered and contained in marine environments and other water-covered areas. The present invention consists of three main parts; which are a vertical flexible oil flow director hose [1], a hollow doughnut-shaped floating device [11], and a toroid sinking weight block [19].

The vertical flexible oil flow director hose [1] consists of two main portions; the lower portion [3], and the upper portion [5]. The lower portion [3] provides three functions: recovering, directing, and filtering the escaping oil/gas mixture by displacing water out of the said hose. The upper portion [5] provides continuing oil flow direction into the oil accumulator [33], where the oil can be pumped into storage containers.

Figure 3:
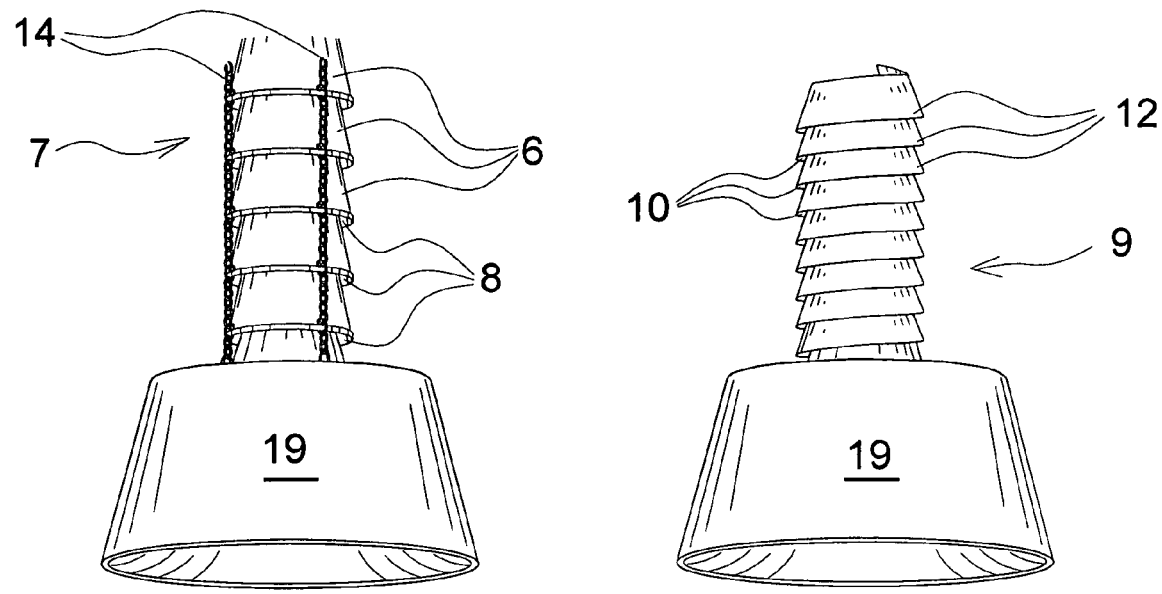
FIG. 3 depicts two other variations for the lower portion of the vertical flexible oil flow director hose. These variations consist of a lamb-shade shaped sleeve type, and helical-coil sleeve type, respectively from left to right.
Figure 4:
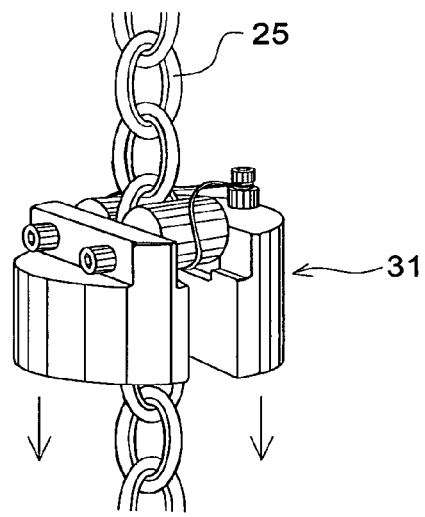
FIG. 4 shows the one-way-sliding line locker mechanism, being put downwardly on a line.
Figure 5:
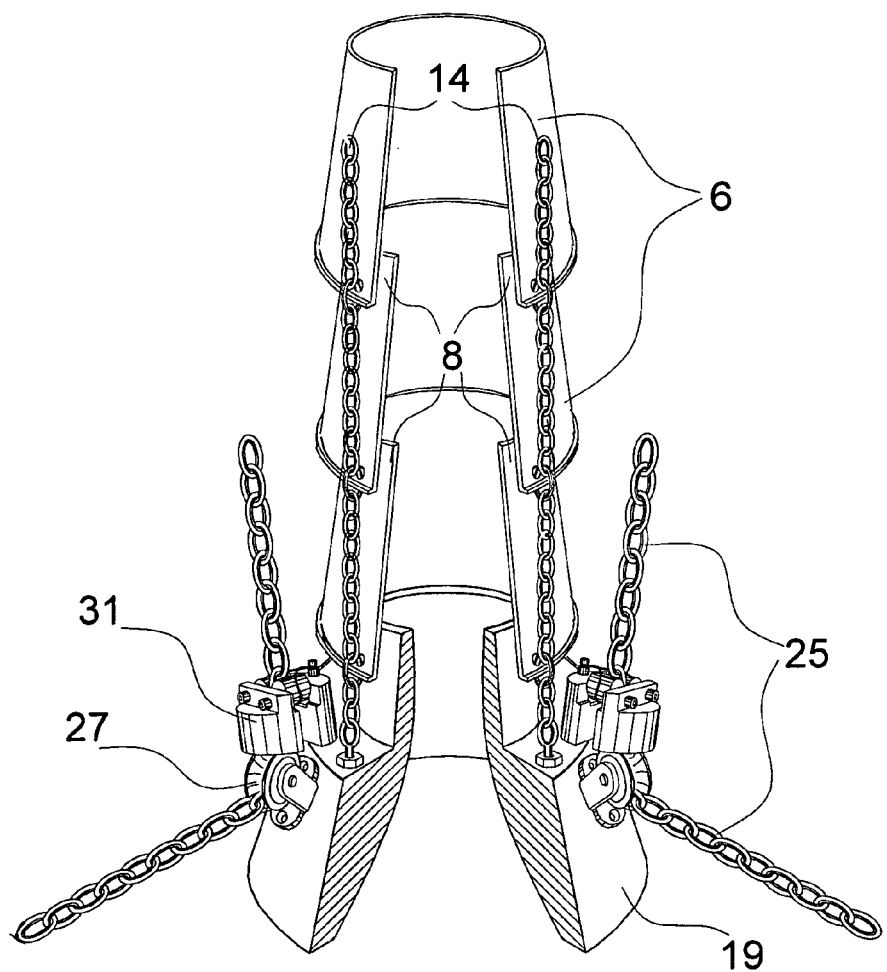
FIG. 5 shows how the funnel-shaped cones are connected to one another by three chains and also shows the cross sectional view of the lower section of the system.

The lower portion [3] is a flexible sleeve which is preferably made of woven screen-like fabric. Alternately, the lower portion [3] can also be made of a series of funnel-shaped cones [6] which overlap and are concentrically connected to one another by three chains [14] to form a vertical sleeve [7], having gaps [8] between funnel-shaped cones [6]. A third alternative for the lower portion [3] would be a vertical helical-coil [9], having gaps [10] between tapered, and overlapping coil circles [12] as shown in FIG. 3.

The upper portion [5] of vertical flexible oil flow director hose [1] is preferably made of watertight fabric, for accumulating the floating oil therein. The upper end of vertical flexible oil flow director hose [1] is concentrically connected to the lower opening of the oil accumulator well [36] inside the hollow doughnut-shaped floating device [11] as shown in FIG. 1.

The doughnut-shaped floating device [11] may be positioned on site by three anchors [13], which are placed 120 degrees apart from one another around the desired position.

The doughnut-shaped floating device [11] has three winches [15], which are mounted outwardly and vertically on the outside at equidistant spaces from one another. These winches [15] connect the doughnut-shaped floating device [11] to each of anchors [13], via lines [17]. Positioning the doughnut-shaped floating device [11] is performed by pulling and/or releasing lines [17] from winches [15], allowing the doughnut shaped floating device [11] to be adjusted along three different planes, to be adjusted along three different points of adjustment.

The lower end of the vertical flexible oil flow director hose [1] is concentrically connected to the upper opening of the toroid sinking weight block [19], opposite to doughnut-shaped floating device [11]. The lower opening of toroid sinking weight block [19] should be considerably larger than the escaping oil hole opening [21], so that it can be placed completely around the hole opening [21], in order to capture all the oil/gas flow and to deliver said flow through the vertical flexible oil flow director hose [1].

Figure 2:
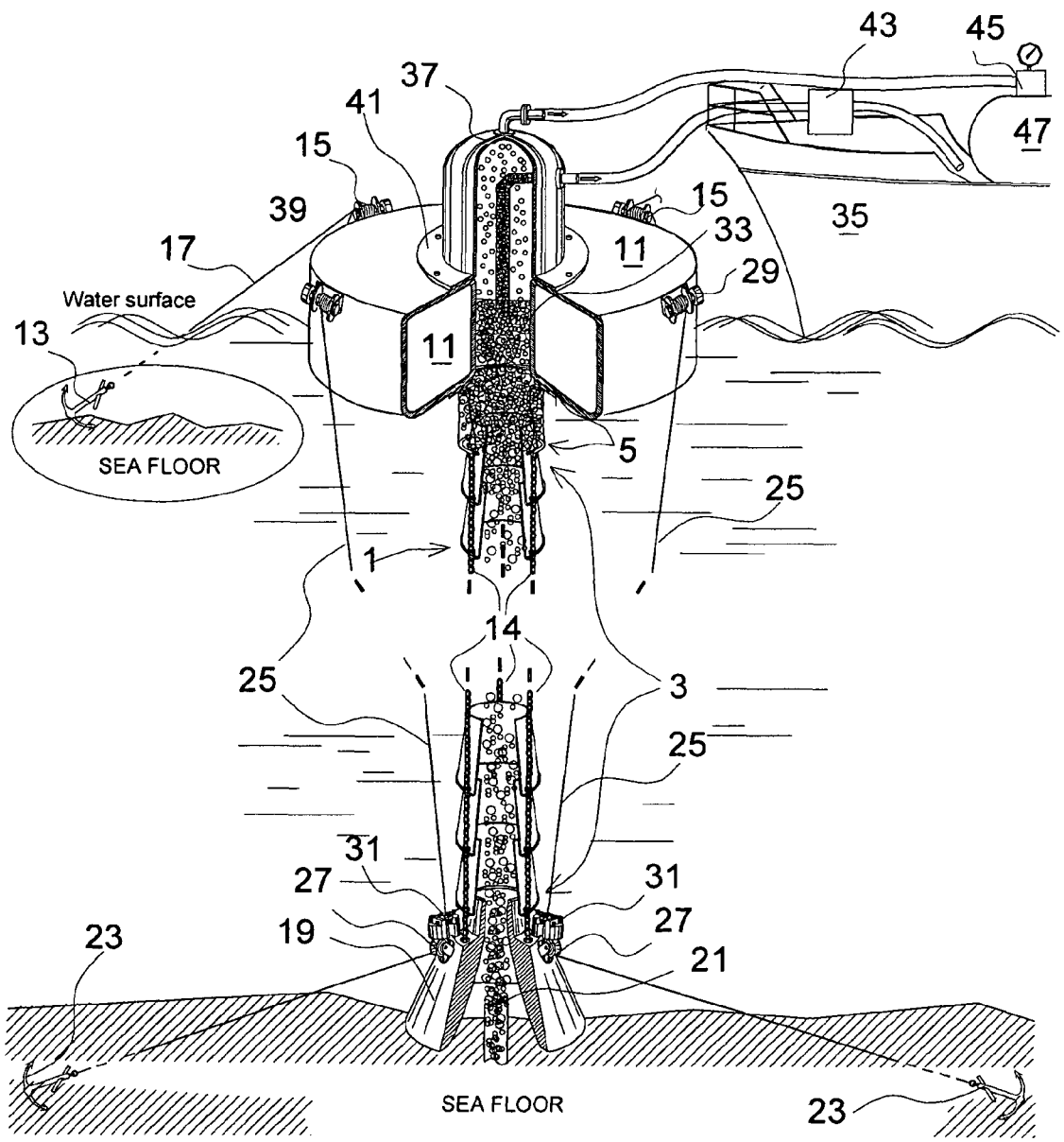
FIG. 2 is a cross sectional view and arrangement of the main parts, which are the vertical oil flow director hose, the hollow doughnut-shaped floating device, and the toroid weight block and gas holding dome cap.

Toroid sinking weight block [19] is positioned directly below the doughnut-shaped floating device [11]. Three additional anchors [23] and lines [25] are used to secure the toroid sinking weight block [19] over the oil escaping hole opening [21]. Anchors [23] should be placed alternating between anchors [13]. Three pulleys [27] are mounted outwardly and vertically on the outside of the toroid sinking weight block [19] with equal distances from one another for connecting toroid sinking weight block [19] to anchors [23] via lines [25]. These lines [25] connect the toroid sinking weight block [19] to the doughnut-shaped floating device [11], and are controlled by winches [29] mounted on the doughnut-shaped floating device [11]. Winches [29] are mounted between winches [15] at alternating intervals, as shown in FIG. 1 and FIG. 2.

The adjustment of the position of toroid sinking weight block [19] is performed by pulling and/or releasing lines [25] from winches [29]. This means that positioning the toroid sinking weight block [19] over the hole opening [21] could be done from the surface of the water, where doughnut-shaped floating device [11] is stationed.

The three releasable, sinking, and one-way-sliding line-lockers [31] are used to lock the tension for the horizontal sections of lines [25], which then holds the position of the toroid sinking weight block [19] in place. These line lockers [31] are capable of being attached to lines [25] even after the lines [25] have been anchored and tensioned. When toroid sinking weight block [19] is positioned, each line locker [31] is attached and released downwardly around each of the vertical section of lines [25]. Gravity forces the line lockers [31] to slide down along with vertical sections of lines [25] until coming to rest on the pulleys [27] mounted on the toroid sinking weight block [19]. Upon coming to rest, the line lockers [31] lock the tension of horizontal section of lines [25], to secure toroid sinking weight block [19] in position, as shown in FIG. 1, FIG. 2, FIG. 4 and FIG. 5.

Positioning of the doughnut-shaped floating device [11] is performed before positioning the toroid sinking weight block [19] over the oil leak opening [21]. When toroid sinking weight block [19] is secured in place, the vertical sections of lines [25] may be released from winches [29], and slackened; or the upper ends of lines [25] may be attached each to individual floats.

When the oil/gas flow goes into vertical flexible oil flow director hose [1], it remains therein and follows vertical hose [1] all the way up to the water surface. The oil/gas mixture is forced to go up to the surface because the oil a) will not mix with water because of its non-polar properties, b) is less dense than water thus will naturally rise to the surface, and c) because oil is thicker and more viscous than water, oil will remain inside the vertical flexible oil flow director hose [1], as long as the holes in the mesh of woven screen-like fabric of the lower portion [3] are small enough. The thicker and more viscous oil displaces the water out through the screen-like fabric of lower portion [3] of vertical flexible oil flow director hose [1].

In cases where gas accompanies oil to the water surface, it is best to use the alternate funnel-shaped cone sleeve [7] or the helical-coil sleeve [9] for the lower portion [3], instead of the woven screen-like fabric. The funnel-shaped cones [6] along the length of lower portion [3] function as reverse funnels, for guiding lighter materials up to the surface. Water is displaced by said lighter materials. The greater density of water forces water down, filtering it out of vertical flexible oil flow director hose [1] through the gaps [8] or [10], as shown in FIG. 3.

When oil reaches the water's surface, it takes the place of water, causing the water to be pushed down and out through the meshes or gaps along the lower portion [3]. Oil is held inside the upper portion [5] of vertical flexible oil flow director hose [1], and becomes a temporary oil accumulator [33]. The oil is then ready to be pumped into a tanker [35] at the surface.

Figure 6:
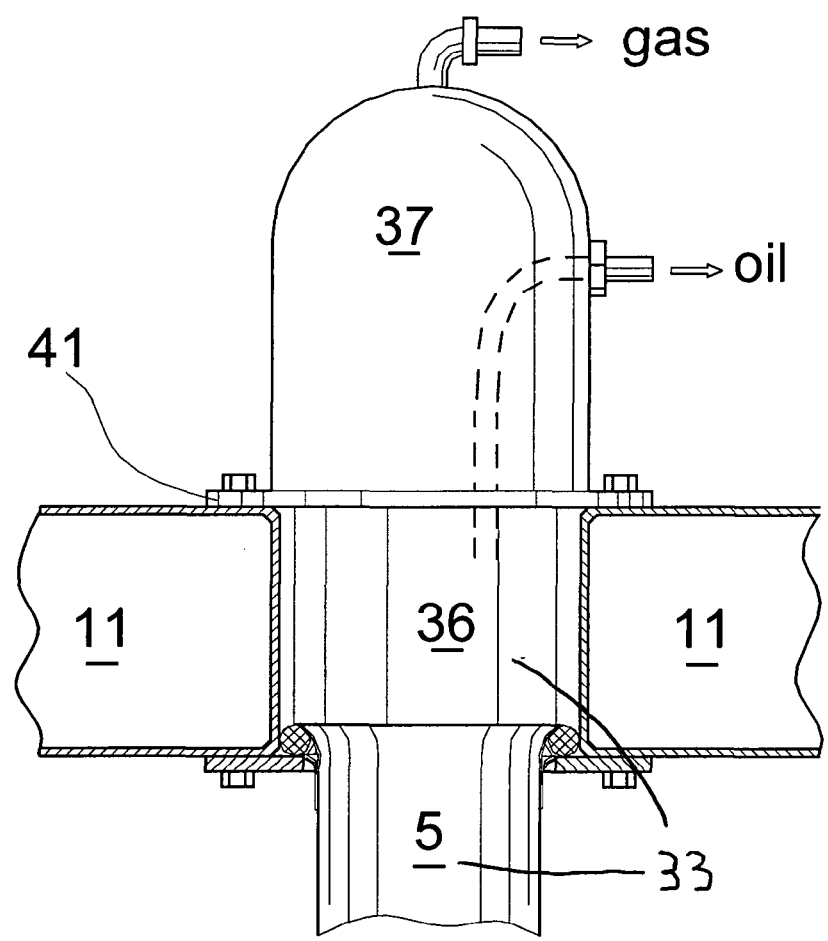
FIG. 6 is a cross sectional view of the upper section of the system with the gas holding dome cap fixed onto the toroid floating device by bolts

A gas-tight dome cap [37] may be used to cap the oil accumulator [33] for the purpose of containing the gas that escapes above the oil. A gas-compressor [45] is used to compress gasses held within the dome cap [37] into gas tanks [47] equipped on tanker [35]. Oil and gas have to be pumped in proportion to the amount of oil and/or gas released from the hole opening [21] to avoid overfilling the oil accumulator [33] and dome cap [37]. The dome cap [37] has an outward flange bracket [41] around its opening at the bottom, providing a means for fastening the dome cap [37] to the upper opening of the oil accumulator well [36], as shown in FIG. 6. Gas is then contained within the dome cap [37].

CONCLUSION, RAMIFICATIONS, AND SCOPE

This invention may be performed as an inexpensive method for oil mining in the sea. It can also be used as a simple, less expensive, but necessary component of an oil company's redundancy plan to ensure that a disaster like the Deepwater Horizon Oil Spill is quickly contained and the damage minimized.

Even if there is no pressure in the oil reserve, this method also can be applied since water is denser than oil. When a hole is drilled into the sea floor, water will drop down into the oil reserve and displace the oil up and out of the opening [21]. Oil then follows the vertical flexible oil flow director hose [1] to the upper section [5], at the water's surface, according to the procedure described above.

These are not the only embodiments of the present invention. Alternatively, different materials may be used for all components. A different system may be applied for anchoring toroid sinking weight block [19] to the sea floor. Components such as the hollow doughnut-shaped floating device [11] may be shaped differently while still performing the same function. The doughnut-shaped floating device [11] itself may be used as the oil tanker or oil storage vessel. Different means may be used to filter the water from the oil and gas mixture.

I claim:

1. A device for recovering and containing underwater oil leaks or for mining oil in a marine environment comprising of:
   a. a collecting element comprising of a vertical flexible oil flow director hose, said vertical flexible oil flow director hose comprising of a lower portion at least having a plurality of gaps to let water filter downwardly out of the said vertical flexible oil flow director hose, and an upper portion at least being watertight for holding accumulated floating oil there within;
   b. said lower portion of said vertical flexible oil flow director hose which provides means for filtering or displacing water out from the said vertical flexible oil flow director hose while retaining the oil mixture therein, comprising:
      i. a series of funnel shaped conical walls, each having an upper opening smaller in circumference than its lower opening, and being overlapping and connected to one and another by a plurality of chains on the outside of said lower portion, at equal spaces thereby forming gaps between adjacent cones, or;
      ii. a helical-coil having a conical, continuous, and overlapping wall, wherein said wall forms an upper opening smaller in width than its lower opening, with a gap between the overlapping wall portions;
   c. a hollow doughnut-shaped floating device comprising of a built-in oil accumulator well, connected by a lower opening to said upper portion of said vertical flexible oil flow director hose, for holding said upper portion of said vertical flexible oil flow director hose at the surface of the water, and providing a means for containing oil collected by said vertical flexible oil flow director hose,
   d. a dome cap for recovering and containing escaping gasses from oil contained in said oil accumulator well, fastened to the top of said oil accumulator well, for holding gas above the oil; and a means for compressing and transporting the accumulated gas to storage,
   e. a toroid sinking weight block being concentrically connected to said lower portion of said vertical oil flow director hose, for holding said lower portion of said vertical oil flow director hose over said oil/gas source, so that an upward flow of oil/gas becomes entrapped at said upper portion of said vertical oil flow director hose, and providing a means for positioning said vertical oil flow director hose over said oil/gas source.

2. A device according to claim 1, wherein a plurality of anchors are placed on the sea floor at equidistant spaces around said leak for positioning said hollow donut shaped floating device and said toroid sinking weight block using a plurality of lines, pulleys and winches connecting said anchors to said floating device and said weight block.

3. A device according to claim 2, further comprising a line-locker capable of being attached to each vertical section of said anchor-lines for securing said circular sinking weight block, by resting on pulleys which are mounted on said toroid sinking weight block.

4. A device according to claim 1, wherein said doughnut-shaped floatation device further comprises an oil storage vessel.

* * * * *